(12) United States Patent
Fukushima et al.

(10) Patent No.: US 9,444,167 B2
(45) Date of Patent: Sep. 13, 2016

(54) TERMINAL AND TERMINAL MANUFACTURING METHOD

(71) Applicant: Yazaki Corporation, Minato-ku, Tokyo (JP)

(72) Inventors: Hirotaka Fukushima, Kakegawa (JP); Daisuke Sugiyama, Kakegawa (JP); Tsutomu Sawada, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/670,743

(22) Filed: Mar. 27, 2015

(65) Prior Publication Data

US 2015/0200481 A1     Jul. 16, 2015

Related U.S. Application Data

(63) Continuation of application No. PCT/JP2013/076779, filed on Oct. 2, 2013.

(30) Foreign Application Priority Data

Oct. 2, 2012   (JP) ................................. 2012-220151

(51) Int. Cl.
*H01R 13/04*     (2006.01)
*B60L 11/18*     (2006.01)
(Continued)

(52) U.S. Cl.
CPC ........... *H01R 13/04* (2013.01); *B60L 11/1818* (2013.01); *H01R 13/405* (2013.01);
(Continued)

(58) Field of Classification Search
CPC ..... H01R 13/44; H01R 13/04; H01R 13/055; H01R 24/28
USPC .......................................... 439/692, 693, 931
See application file for complete search history.

(56) References Cited

U.S. PATENT DOCUMENTS 4,037,319 A * 7/1977 Maloof ................... H01R 24/58
29/858
4,335,930 A * 6/1982 Feldman ................ H01R 24/58
439/669
(Continued)

FOREIGN PATENT DOCUMENTS

JP          50-18995 U      3/1975
JP          09-245880 A     9/1997
(Continued)

OTHER PUBLICATIONS

International Search Report for PCT/JP2013/076779 dated Dec. 24, 2013.
(Continued)

*Primary Examiner* — Hien Vu
(74) *Attorney, Agent, or Firm* — Sughrue Mion, PLLC

(57) ABSTRACT

A male terminal (40) includes a terminal body (41) and an insulating member (45). The terminal body (41) includes a cylindrical terminal contact portion (42) provided with a penetration hole (42a) extending in the axial direction. The insulating member (45) includes a tip insulating portion (46) projecting forward from the tip of the terminal contact portion (42), a terminal holding portion (47) disposed on the rear side of the terminal contact portion (42) to hold the terminal body (41), and a communicating resin portion (48) disposed in the penetration hole (42a) to connect the tip insulating portion (46) and the terminal holding portion (47).

2 Claims, 4 Drawing Sheets

(51) Int. Cl.
*H01R 24/66* (2011.01)
*H01R 13/405* (2006.01)
*H01R 43/24* (2006.01)
*H01R 13/44* (2006.01)
*H01R 43/16* (2006.01)

(52) U.S. Cl.
CPC ............ *H01R 24/66* (2013.01); *H01R 13/44* (2013.01); *H01R 43/16* (2013.01); *H01R 43/24* (2013.01); *Y02T 10/7005* (2013.01); *Y02T 10/7072* (2013.01); *Y02T 90/14* (2013.01); *Y02T 90/16* (2013.01)

(56) References Cited

U.S. PATENT DOCUMENTS

| | | | | |
|---|---|---|---|---|
| 4,487,463 A * | 12/1984 | Tillotson | ............... | H01R 9/091 439/345 |
| 5,558,533 A | 9/1996 | Hashizawa et al. | | |
| 5,573,417 A | 11/1996 | Hashizawa et al. | | |
| 5,674,086 A | 10/1997 | Hashizawa et al. | | |
| 6,113,436 A | 9/2000 | Kuwahara et al. | | |
| 6,146,211 A * | 11/2000 | Okamoto | ............... | H01R 13/04 439/181 |
| 7,264,494 B2 * | 9/2007 | Kennedy | ............... | H01R 13/405 439/274 |
| 8,172,627 B2 * | 5/2012 | Gleason | ............... | A61B 18/14 439/886 |
| 2011/0053404 A1 | 3/2011 | Tsuruta et al. | | |

FOREIGN PATENT DOCUMENTS

| | | |
|---|---|---|
| JP | 10-275653 A | 10/1998 |
| JP | 2000-3750 A | 1/2000 |
| JP | 2000-150040 A | 5/2000 |
| JP | 2011-48983 A | 3/2011 |

OTHER PUBLICATIONS

Communication dated May 17, 2016, issued by the Japan Patent Office in corresponding Japanese Application No. 2012-220151.

* cited by examiner

TERMINAL AND TERMINAL MANUFACTURING METHOD

CROSS REFERENCE TO RELATED APPLICATIONS

This application is a Continuation of PCT Application No. PCT/JP2013/076779, filed on Oct. 2, 2013, and claims the priority of Japanese Patent Application No. 2012-220151, filed on Oct. 2, 2012, the content of both of which is incorporated herein by reference.

BACKGROUND

1. Field of the Invention

The present invention relates to terminals provided with insulating portions at tips thereof and terminal manufacturing methods.

2. Related Art

An electric vehicle is equipped with a charge inlet device to be connected to a charge connector on a charge stand side or the like so as to receive electricity for charge (refer to Japanese Unexamined Patent Application Publication No. H10-275653). The charge inlet device houses male terminals therein.

FIGS. 1A and 1B each show a conventional male terminal 100. The male terminal 100 includes a conductive terminal body 110 having a terminal contact portion 111 to be brought into contact with a mating terminal (not shown in the figures), and a tip insulating portion 120 having an insulating property (made of a resin) formed at the tip of the terminal contact portion 111 and fixed to the terminal body 110. The tip of the terminal contact portion 111 is provided with a narrow portion 112 and a flange portion 113 projecting forward from the tip of the terminal contact portion 111. The tip insulating portion 120 includes a stepped penetration hole 121 penetrating in the axial direction and is provided, on the rear side thereof, with an engaging portion 122 engaging with the narrow portion 112.

When assembling the male terminal 100 having such a configuration, the flange portion 113 projecting forward from the tip of the terminal contact portion 111 of the terminal body 110 is inserted into the stepped penetration hole 121 of the tip insulating portion 120, and the engaging portion 122 located on the rear side of the tip insulating portion 120 engages with the narrow portion 112 so that the tip insulating portion 120 is fixed to the terminal body 110. The tip insulating portion 120 having an insulating property can prevent a user from directly touching a conductive part of the male terminal 100.

SUMMARY OF THE INVENTION

However, the conventional example requires strength to keep engaging the narrow portion 112 of the terminal body 110 with the engaging portion 122 of the tip insulating portion 120, which requires precision in manufacture of both the terminal body 110 and the tip insulating portion 120. As a result, it is difficult to achieve a reduction in cost of components. In particular, it is required to manufacture the narrow portion 112 of the terminal body 110 by cutting processing, which tends to be difficult to perform small-sized processing and thus difficult to miniaturize the male terminal 100.

The present invention has been made in order to solve the above-mentioned problems. An object of the present invention is to provide a terminal and a method for manufacturing the terminal capable of improving strength to hold a tip insulating portion in a terminal body and achieving a reduction in cost of components.

According to a first aspect of the present invention, there is provided a terminal including: a conductive terminal body including a terminal contact portion provided with a communicating space portion extending in an axial direction; and an insulating member including a tip insulating portion projecting forward from a tip of the terminal contact portion, a terminal holding portion disposed on a rear side of the terminal contact portion to hold the terminal body, and a communicating resin portion disposed in the communicating space portion to connect the tip insulating portion and the terminal holding portion.

According to a second aspect of the present invention, the terminal holding portion includes a fitting portion to which an elastic member is fitted on an outer circumferential side thereof.

According to a third aspect of the present invention, there is provided a method for manufacturing a terminal, the method including: using, as an insert component, a conductive terminal body including a terminal contact portion provided with a communicating space portion extending in an axial direction; and insert injection molding an insulating member including a tip insulating portion projecting forward from a tip of the terminal contact portion, a terminal holding portion disposed on a rear side of the terminal contact portion to hold the terminal body, and a communicating resin portion disposed in the communicating space portion to connect the tip insulating portion and the terminal holding portion.

According to the aspects of the present invention, since the insulating member is a member in which the tip insulating portion, the terminal holding portion and the communicating resin portion connecting these portions are continuously integrated through the communicating space portion of the terminal contact portion, the insulating member can be insert injection molded by use of the terminal body as an insert component. Since there is no need to form a narrow portion and an engaging portion necessary for the conventional example requiring cutting processing with high accuracy, and the terminal body can be manufactured by press processing instead of cutting processing, a reduction in cost of components can be achieved. The tip insulating portion is integrated with the terminal holding portion via the communicating resin portion passing through the inside of the terminal contact portion so as to improve the strength to hold the tip insulating portion in the terminal body because there is no fragile portion such as the narrow portion and the engaging portion necessary for the conventional example.

In addition, since the terminal includes the tip insulating portion and the terminal holding portion integrated together, the number and cost of components and the cost of assembling processing can be reduced.

DESCRIPTION OF THE EMBODIMENTS

Hereinafter, the embodiment of the present invention will be described by reference to the drawings.

Figure 1A:
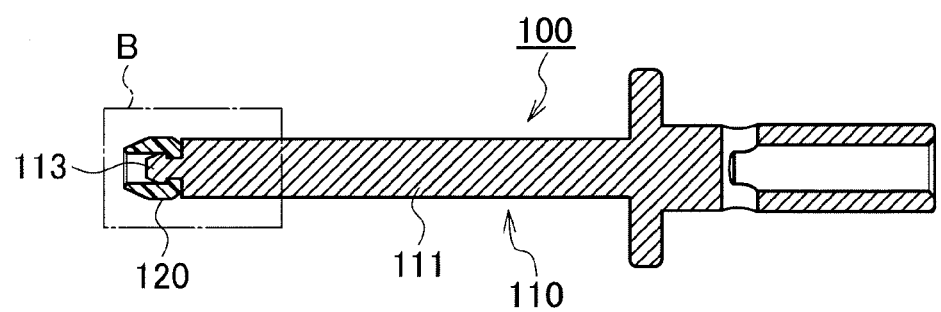
FIG. 1A is a cross-sectional view of a conventional male terminal.
Figure 1B:
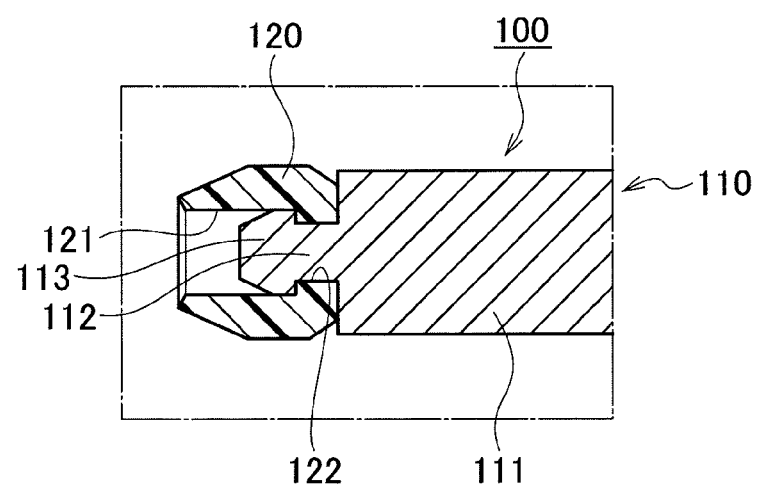
FIG. 1B is an enlarged cross-sectional view of B in FIG. 1A.
Figure 2:
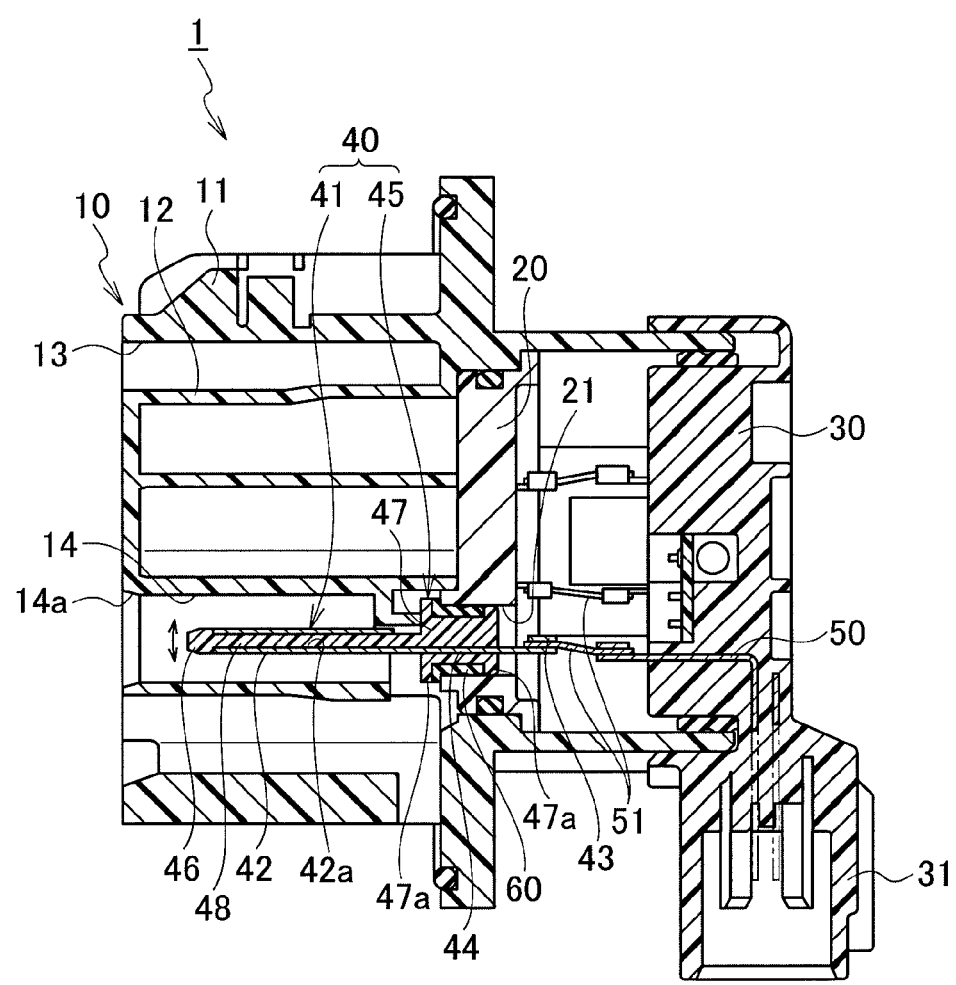
FIG. 2 is a cross-sectional view of a charge inlet device according to an embodiment of the present invention.
Figure 3:
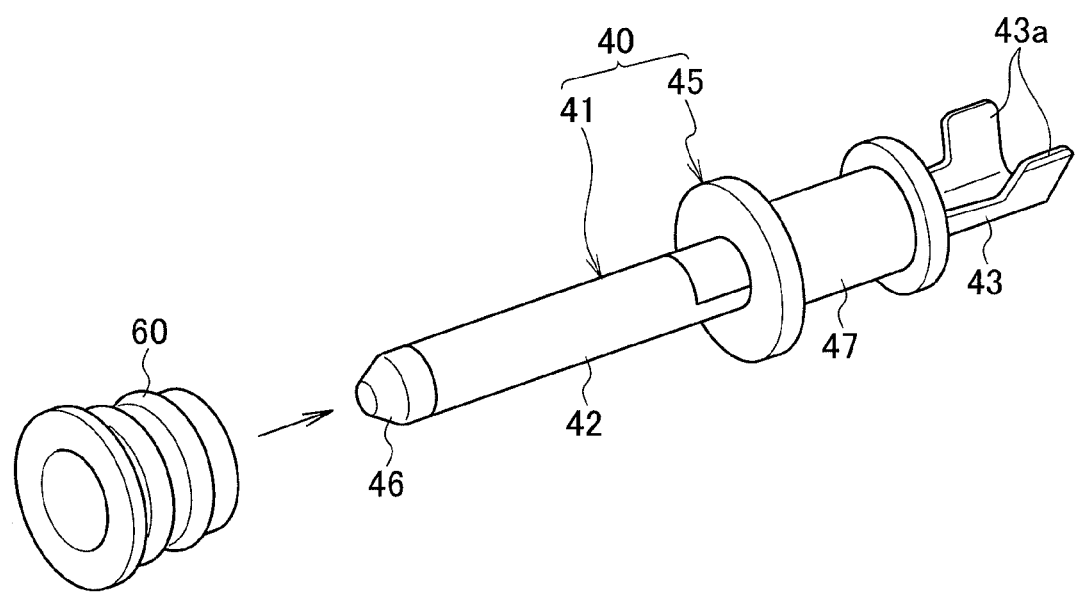
FIG. 3 is a perspective view of a male terminal according to the embodiment of the present invention.
Figure 4:
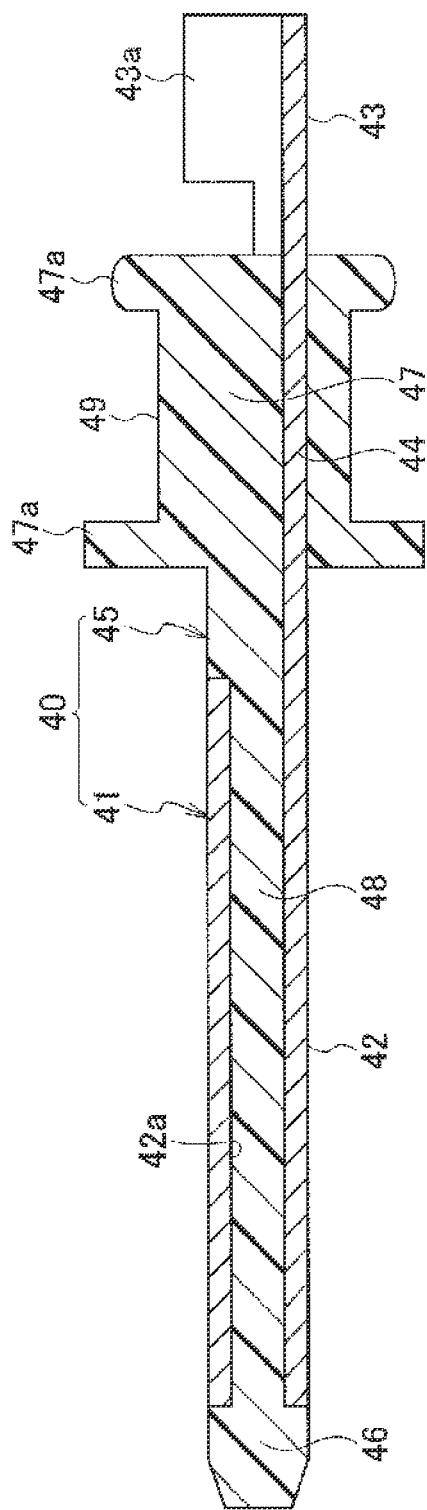
FIG. 4 is a cross-sectional view of the male terminal according to the embodiment of the present invention.

FIG. 2 to FIG. 4 illustrate a charge inlet device and a male terminal according to the embodiment of the present invention. In the present embodiment, a terminal according to the present invention is applied to a terminal for the charge inlet device.

The charge inlet device 1 shown in FIG. 2 is installed in a vehicle. The charge inlet device 1 is fitted to a charge connector (not shown in the figure) of a charge stand or the like to receive power via the charge connector.

The charge inlet device 1 includes a housing group including an inlet housing 10 fixed to a vehicle body panel and having a charge inlet 13 open to the outside of a vehicle body, an inner housing 20 located inside the inlet housing 10, and a rear housing 30 fitted to a rear portion of the inlet housing 10 (inside the vehicle body).

The inlet housing 10 includes a cylindrical exterior case portion 11 and a connector housing portion 12 located in the inner circumferential space of the exterior case portion 11. The opening of the exterior case portion 11 is the charge inlet 13. The connector housing portion 12 is provided with a plurality of terminal housing holes 14. The terminal housing holes 14 each house a terminal contact portion 42 of a male terminal (terminal) 40. The male terminals 40 are connected to female terminals (not shown in the figure) inserted from insertion inlets 14a of the terminal housing holes 14. Note that only one male terminal 40 is shown in FIG. 2.

The inner housing 20 includes terminal holding holes 21 located at positions open to the respective terminal housing holes 14. The respective male terminals 40 are held in the corresponding terminal holding holes 21. The configuration of the male terminals 40 is described in detail below.

The rear housing 30 covers the rear side of the inlet housing 10. The rear housing 30 is provided with an electric wire drawing hood portion 31. One end of each electric wire drawing terminal 50 is located in the electric wire drawing hood portion 31. The rear housing 30 is formed in a manner such that each of the electric wire drawing terminals 50 is insert injection molded as an insert component. The other end of each electric wire drawing terminal 50 is connected to the male terminal 40 via a junction electric wire 51. Namely, electric wire-side connectors (not shown in the figure) are fitted into the electric wire drawing hood portion 31 of the rear housing 30, and electric wires drawn out of the electric wire-side connectors are used for wiring on the vehicle body side.

Next, the configuration of the male terminal 40 is described below. As shown in detail in FIG. 3 and FIG. 4, the male terminal 40 includes a conductive terminal body 41 and an insulating member 45 fixed to the terminal body 41. The terminal body 41 is formed in a manner such that a conductive plate having a prescribed shape is bent by press processing. The terminal body 41 includes a terminal contact portion 42 with which a mating female terminal (not shown in the figure) comes into contact, an electric wire connecting portion 43, and a joint portion 44 (shown in FIG. 4) connecting these portions together. The terminal contact portion 42 is formed into a cylindrical shape having a penetration hole 42a which is a communicating space portion extending in the axial direction. The electric wire connecting portion 43 includes a pair of crimp pieces 43a by which the junction electric wire 51 is crimped and connected.

The insulating member 45 is made of an insulating resin. The insulating member 45 includes a tip insulating portion 46 projecting forward from the tip of the terminal contact portion 42, a terminal holding portion 47 disposed on the outer circumference of the joint portion 44 on the rear side of the terminal contact portion 42, and a communicating resin portion 48 disposed in the penetration hole 42a of the terminal contact portion 42 to connect the tip insulating portion 46 and the terminal holding portion 47.

The terminal holding portion 47 has substantially a columnar shape. The terminal holding portion 47 is provided, at both edges of the outer circumference thereof, with a pair of ribs 47a each projecting along the entire circumference. The outer circumference of the terminal holding portion 47 is provided with a fitting recessed portion 49 which is a fitting portion formed between the pair of ribs 47a. A packing 60 having substantially a cylindrical shape serving as an elastic member is attached to the fitting recessed portion 49. The terminal holding portion 47 to which the packing 60 is attached is fitted into the terminal holding hole 21 of the inner housing 20 so that the male terminal 40 is fixed to the inner housing 20. In particular, the rib 47a on the rear side of the terminal holding portion 47 and the packing 60 are tightly attached to the inner surface of the terminal holding hole 21 (refer to FIG. 2). Thus, the male terminal 40 can change the direction of the axis inside the inner housing 20 in association with elastic deformation of the packing 60 (refer to the arrow indicated in FIG. 2). The male terminal 40 can be subjected to axial adjustment when the female terminal (not shown in the figure) with the axis inclined is inserted into the inner housing 20.

The male terminal 40 having the configuration described above is manufactured in a manner such that the insulating member 45 having an insulating property including the tip insulating portion 46, the terminal holding portion 47 and the communicating resin portion 48 is insert injection molded by use of the conductive terminal body 41 as an insert component including the cylindrical terminal contact portion 42 provided therein with the penetration hole 42a extending in the axial direction.

Due to the configuration described above, even when a user's finger is inserted into the terminal housing hole 14, the finger comes into contact with the tip insulating portion 46 so as to be prevented from directly touching the terminal body 41 as a conductive member located behind the tip insulating portion 46.

As described above, since the insulating member 45 is a member in which the tip insulating portion 46, the terminal holding portion 47 and the communicating resin portion 48 connecting these portions are continuously integrated through the penetration hole 42a of the terminal contact portion 42, the insulating member 45 can be insert injection molded by use of the terminal body 41 as an insert component. Since there is no need to form a narrow portion and an engaging portion necessary for the conventional example requiring cutting processing with high accuracy, and the terminal body 41 can be manufactured by press processing instead of cutting processing, a reduction in cost of components can be achieved. The tip insulating portion 46 is integrated with the terminal holding portion 47 via the communicating resin portion 48 passing through the inside of the terminal contact portion 42 so as to improve the strength to hold the tip insulating portion 46 in the terminal body 41 because there is no fragile portion such as the narrow portion and the engaging portion necessary for the conventional example.

In addition, since the male terminal 40 includes the tip insulating portion 46 and the terminal holding portion 47 integrated together, the number and cost of components and the cost of assembling processing can be reduced.

Since the tip insulating portion 46 is formed by insert injection molding, the outer circumferential surface of the tip insulating portion 46 can be set, with high accuracy, to be even with or slightly lower than the outer circumferential surface of the terminal contact portion 42. Accordingly, the fitted female terminal (not shown in the figure) can reliably be prevented from being stuck on a step formed at a boundary between the outer circumferential surface of the terminal contact portion 42 and the outer circumferential surface of the tip insulating portion 46 in the process of extracting the fitted female terminal.

The terminal holding portion 47 includes the fitting recessed portion 49 to which the packing 60 is fitted on the outer circumferential side thereof. Accordingly, the male terminal 40 can be swingably held in the inner housing 20 via the terminal holding portion 47 and can have an axis adjusting function.

In the embodiment, the terminal holding portion 47 integrated with the tip insulating portion 46 is a member for swingably holding the male terminal 40 inside the housing; however, the terminal housing portion itself may serve as the housing when the male terminal 40 is fixed to the housing so as not to move therein. Namely, the male terminal 40 may be formed in a manner such that the tip insulating portion 46 and the housing are integrated together.

In the embodiment, the communicating space portion is the penetration hole 42a; however, the communicating space portion is not particularly limited as long as it penetrates the terminal contact portion 42 from the front side to the rear side so that molten resin can flow therethrough in the axial direction.

Although in the embodiment described above exemplifies the case where the terminal according to the present invention is applied to the male terminal 40 for the charge inlet device 1, the present invention is not limited to this and is, of course, applicable to other terminals.

What is claimed is:

1. A terminal comprising:
    a conductive terminal body including a terminal contact portion provided with a communicating space portion extending in an axial direction; and
    an insulating member including a tip insulating portion projecting forward from a tip of the terminal contact portion, a terminal holding portion disposed on a rear side of the terminal contact portion to hold the terminal body, and a communicating resin portion disposed in the communicating space portion to connect the tip insulating portion and the terminal holding portion, wherein
    the terminal holding portion includes a fitting portion to which an elastic member is fitted on an outer circumferential side of the terminal holding portion,
    wherein the terminal holding portion is provided with a pair of ribs formed on both ends in the axial direction and projecting from an outer circumference of the terminal holding portion,
    wherein the fitting portion is formed between the pair of ribs, and
    wherein a length of the fitting portion in the axial direction is longer than a total length of the pair of ribs in the axial direction.

2. A method for manufacturing a terminal, the method comprising:
    forming a conductive terminal body including a terminal contact portion provided with a communicating space portion extending in an axial direction; and
    insert injection molding an insulating member into the conductive terminal body, the insulating member including a tip insulating portion projecting forward from a tip of the terminal contact portion, a terminal holding portion disposed on a rear side of the terminal contact portion to hold the terminal body and provided with a pair of ribs formed on both ends in the axial direction and projecting from an outer circumference of the terminal holding portion and further provided with a fitting portion formed between the pair of ribs to receive an elastic member on the fitting portion, and a communicating resin portion disposed in the communicating space portion to connect the tip insulating portion and the terminal holding portion.

* * * * *